United States Patent Office 3,415,716
Patented Dec. 10, 1968

3,415,716
PREPARATION OF HYDROXYCYCLO-
PENTENONES
Julius Berger, Passaic, Richard Wightman Kierstead,
North Caldwell, Ronald Andrew Lemahieu, Bloomfield,
and Benjamin Tabenkin, Upper Montclair, N.J., assignors to Hoffmann-La Roche Inc., Nutley, N.J., a corporation of New Jersey
No Drawing. Filed May 17, 1966, Ser. No. 550,599
18 Claims. (Cl. 195—51)

This invention relates to a process for the preparation of 2-R-3-methyl-4-hydroxy-cyclopent-2-enones (R is alkyl, alkenyl or alkadienyl of 3 to 5 carbon atoms) which are valuable intermediates in the synthesis of pyrethrins and pyrethrin analogs, a known class of compounds noted for their insecticidal properties.

The class of compounds commonly referred to as pyrethrins is generally understood to include the four major active ingredients of pyrethrum viz. Pyrethrin I, Cinerin I, Pyrethrin II and Cinerin II. Pyrethrum is the commercial extract of the herbaceous perennial *Chrysanthemum cinerariaefolium* and is an important source of natural insecticides. The pyrethrins which, as noted above, comprise the major insecticidal constituents of pyrethrum and particularly the two components Pyrethrin I and Cinerin I are especially useful insecticides by virtue of their increased insecticidal potency when used with known synergists, e.g., piperonyl butoxide, their low mammalian toxicity, rapid knockdown or paralytic properties, and the absence of induced insect resistance from exposure to sublethal doses.

Owing to their importance, the preparation of pyrethrins has been the subject of much investigation. There are, however, no commercially acceptable syntheses available for the preparation of the pyrethrins and the entire commercial production of pyrethrins is accomplished by extraction from pyrethrum flowers. Such commercial extraction procedures involve treatment with organic solvents which invariably results in the extraction of substantial amounts of inactive and undesirable impurities necessitating costly and cumbersome purifications in order to obtain insecticidally useful pyrethrins. The novel process of this invention provides a method for the synthesis of components of the pyrethrins and pyrethrin analogs via easily accessible starting materials.

More particularly, the present invention relates to a microbiological process which comprises transforming a 2-R-3-methyl-cyclopent-2-enone to a 2-R-3-methyl-4-hydroxy-cyclopent-2-enone by the action of a microbial enzyme system as outlined schematically in the following diagram:

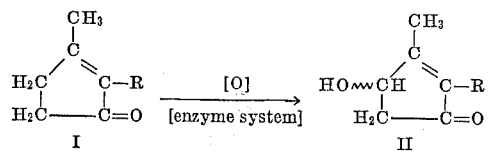

wherein the symbol R represents an alkyl, alkenyl or alkadienyl of 3 to 5 carbon atoms.

The cyclopentenone starting materials of Formula I are a known class of compounds which are readily available or can be prepared by procedures known to the art.

Among the cyclopent-2-enones exemplifying the starting materials of Formula I which may be suitably employed in the process of this invention, there can be named the following: 2-propyl-3-methyl-cyclopent-2-enone; 2-butyl-3-methyl-cyclopent-2-enone; 2-pentyl-3-methyl-cyclopent-2-enone; 2-allyl-3-methyl-cyclopent-2-enone (allethrone); 2-(but - 2 - enyl)-3-methyl-cyclopent-2-enone (cinerone); 2 - (but-3-enyl)-3-methyl-cylopent-2-enone; 2 - (pent-2-enyl)-3-methyl-cyclopent-2-enone (jasmone); 2 - (pent-3-enyl)-3-methyl-cyclopent-2-enone; 2 - (pent-4-enyl)-3-methyl-cyclopent-2-enone; 2-(pent-2,4-dienyl)-3-methyl-cyclopent-2-enone (pyrethrone) from which there are obtained the corresponding hydroxylated compounds of Formula II, i.e., 2-propyl-3-methyl-4-hydroxy-cyclopent-2-enone; 2-butyl-3-methyl-4-hydroxy-cyclopent-2-enone; 2-pentyl-3-methyl-4-hydroxy-cyclopent-2-enone; 2 - allyl - 3 - methyl - 4-hydroxy-cyclopent-2-enone (allethrolone); 2-(but-2-enyl)-3-methyl-4-hydroxy-cyclopent-2-enone (cinerolone); 2-(but - 3 - enyl)-3-methyl-4-hydroxy-cyclopent-2-enone; 2-(pent-2-enyl)-3-methyl-4-hydroxy-cyclopent-2-enone (jasmolone); 2-(pent-3-enyl)-3-methyl-4-hydroxy-cyclopent-2-enone; 2-(pent-4-enyl)-3-methyl-4-hydroxy-cyclopent-2-enone; and 2-(pent-2,4-dienyl) - 3-methyl-4-hydroxy-cyclopent-2-enone (pyrethrolone).

Conversion of the 2-R-3-methyl-4-hydroxy-cyclopent-2-enone products of Formula II to the insecticidally useful pyrethrins and pyrethrin analogs is readily accomplished by esterification with the appropriate cyclopropane carboxylic acid, e.g., chrysanthemum monocarboxylic acid (chrysanthemic acid), pyrethric acid and the like, which are known in the art. The preparation of pyrethrins and pyrethrin analogs by esterification of substituted 3-methyl-4-hydroxy-cyclopent-2-enones with cyclopropane carboxylic acids has been described, for example, by, among others, L. Crombie et al., JCS p. 3963 (1956), L. Crombie et al. JCS p. 1152 (1950) and Schechter et al. JACS Vol. 71, p. 3165 (1949).

As indicated above, the process of this invention in addition to providing a novel synthetic route for the preparation of the naturally occurring pyrethrin insecticides can also be employed in the preparation of synthetic analogs of the pyrethrins such as, for example, allethrin, which can be obtained by esterification of allethrolone obtained according to the process described herein. The enzymatic hydroxylations of compounds of Formula I wherein R represents alkenyl or a conjugated alkadienyl constitute the preferred processes of this invention. Especially preferred are the conversion of allethrone to allethrolone, cinerone to cinerolone, and pyrethrone to pyrethrolone.

The 2 - R - 3 - methyl - 4-hydroxy-cyclopent-2-enones of Formula II can exist as stereoisomers. The process of this invention includes the preparation of all of the possible stereoisomers, i.e., in the form of their racemic mixtures as well as their separated optically active antipodes. Where the product is obtained as a racemic mixture, it can be readily resolved into its optical antipodes by techniques known to the art. Since the cyclopropane carboxylic acids utilized in the esterification are also known to exist as stereoisomers, it is possible by selecting the appropriate stereoisomers of the 2-R-3-methyl-4-hydroxy-cyclopent-2-enone and the cyclopropane carboxylic acid to prepare any desired isomer of the pyrethrins or pyrethrin analogs.

The microbiological conversion of compounds of Formula I to compounds of Formula II according to the process of this invention is accomplished by reaction of an enzyme system of a microorganism selected from microorganisms of Phylum *eumycophyta* and Phylum *schizomycophyta*, more particularly, a microorganism selected from one of the following classes: Phycomycetes, Ascomycetes, Deuteromycetes, Basidiomycetes, Schizomycetes and Schizophyceae. Microorganisms answering to the above description which are particularly well suited to the process of this invention are members selected from the following orders: Mucorales, Plectascineae, Sphaeriales, Moniliales, Dacrymycetales, Actinomycetales, Eubacteriales and Pseudomonodales, and especially a member selected from the family Mucoraceae, the family Thamnidaceae, the family Aspergillaceae, the family Chaetomiaceae, the family Moniliaceae, the family Dematiaceae, the family Tuberculariaceae, the family Dacrymycetaceae, the family Streptomycetaceae, the family Bacillaceae, the family Micrococcaceae, the family Enterobacteriaceae or the family Spirillaceae. Among the genera of microorganisms within the above-named classifications from which a specific strain of microorganism suitable for the production of enzyme systems of this invention is selected there can be named specifically the following exemplars: Mucor, Rhizopus, Helicostylum, Aspergillus, Penicillium, Chaetomium, Beauvaria, Trichothecium, Trichoderma, Curvularia, Cylindrocarpon, Fusarium, Dacrymyces, Dacryopinax, Streptomyces, Bacillus, Staphylococcus, Serratia and Cellvibrio. The numerous strains of microorganisms selected from species falling within the above-named classifications which can be suitably employed for the novel conversion of this invention are exemplified by the following species: *Mucor hiemalis, Mucor parasiticus, Rhizopus arrhizus, Rhizopus nigricans, Helicostylum pyriforme, Aspergillus chevalieri, Aspergillus clavatus, Aspergillus fasciculatus, Aspergillus flavus, Aspergillus nidulans, Aspergillus niger, Aspergillus oryzae, Aspergillus tamarii, Penicillium cyclopium, Penicillium javanicum, Penicillium lilacinum, Chaetomium globosum, Beauvaria bassiana, Trichothecium, lignorum, Curvularia lunata, Curvularia pallescens, Cylindrocarpon radicicola, Fusarium culmorum, Dacrymyces deliquescens, Dacryopinax spathularia, Streptomyces aureofaciens, Streptomyces fradiae, Streptomyces griseus, Bacillus alvei, Bacillus pumilus, Serratia marcescens, Cellvibrio vulgaris;* and by the strains: Staphylococcus sp. QMB 821, Streptomycete sp. NRRL 3232, Thermophilic streptomycete sp. 3232 and Thermophilic strepomycete sp. 3233.

The classification and nomenclature of microorganisms employed throughout this specification is that used in the most recent editions of Bergey's Manual of Determinative Bacteriology, 7th Edition (1957), incorporating nomenclatural changes which have been adopted in Opinions, published subsequent to 1957; F. E. Clements and C. L. Shear, The Genera of Fungi, H. W. Wilson Co., New York 1931; and E. A. Bessey, Morphology and Taxonomy of Fungi, Blakiston Co., Philadelphia, 1950 as modified by C. J. Alexopoulos and E. S. Beneke, Laboratory Manual for Introductory Mycology, Burgess, Minneapolis, 1952.

Specific strains of the various microorganisms employed in the process of this invention are available from known culture collections. They can be obtained, for example, from one of the following:

American Type Culture Collection (ATCC)
12301 Parklawn Drive
Rockville, Md. 20852
Centraalbureau voor Schimmelcultures (CBS)
Baarn, Netherlands
Northern Utilization Research and Development Division (NRRL) United States Department of Agriculture
1815 N. University St.
Peoria, Ill. 61604
Quartermaster Research and Development Center (QM)
United States Army
Natick, Mass.

The novel conversion of this invention is conveniently carried out according to the following procedure: A suitable microorganism is cultured in a medium containing the appropriate nutrients. After cultivation the entire culture, spores or cells, or culture fluid collected from the culture, or enzyme preparations including cell-free enzyme preparations obtained from the culture by means of conventional methods in enzymology are brought into contact with a cyclopentenone of Formula I above whereby there is produced a compound of Formula II.

Utilization of the microbial agent in bringing about the novel conversion of this invention can be accomplished by cultivating the microorganism in the presence of a compound of Formula I as the substrate under conditions similar to those employed in growing the culture. The action of a microorganism of the type enumerated above upon a substrate selected from the compounds of Formula I can be considered to be an enzymatic hydroxylation and such enzymatic hydroxylation when accomplished in the presence of the enzyme producing organism is also referred to herein as a fermentation. The fermentation process of this invention accomplishes a selective substitution of a hydroxyl group for a hydrogen in the 4-position of the cyclopentenone derivative employed as substrate. Alternatively, the novel conversion of this invention can be accomplished by separating the hydroxylating enzyme system from the microorganism and contacting the cell-free enzyme system with a compound of Formula I.

The composition of the nutrient medium utilized for culturing the microorganism, as well as for the fermentation, may vary widely. The microorganisms suitably employed in the process of this invention are conveniently grown in a nutrient composition suitable for the proliferation of the cells which produce the hydroxylating enzyme. Generally speaking, such nutrient medium should contain assimilable sources of nitrogen and carbon and sources of such other nutrients as phosphorus, sulfur, potassium, trace elements and such other growth-promoting factors as the microorganism may require. As sources of nitrogen the following have been found satisfactory: crude or refined proteins, peptones, protein hydrolysates or digests, amino acids, urea, ammonium, nitrogen and mixtures thereof. As sources of carbon, the metabolizable sugars, the dextrins, starches, lipids, bean or seed meals or combinations thereof are satisfactory. The pH of the culture and fermentation systems may vary from about 2 to about 9, but the preferred range is from about pH 4 to about pH 8, depending upon the specific organism employed. The temperature of these systems may vary from about 20° C. to about 50° C., preferred range being from about 28° C. to about 48° C., depending upon the organism selected. The time for the cultivation varies with the type of microorganism and the nutrient medium employed though ordinarily a satisfactory culture can be obtained in 1 to 6 days and substantial conversion of substrate is usually effected during a 1 to 10 day fermentation period. The fermentation is aerobic. Thus, agitation and aeration are desirable for optimum results. Conveniently, the fermentation is conducted in an aqueous medium in an aerated fermentor. The concentration of the substrate may be varied over a wide range up to 5 or more grams per liter of culture being used. It is preferred, however, to operate in the range of 0.5–2 grams of substrate per liter of culture.

The substrate may be contacted with the organism and its enzymes without removing them from the growth medium or alternatively, the microorganism cells and enzymes may be first separated from the growth medium and contacted with the substrate in an aqueous menstruum other than the growth medium. The substrate may be added all at once to the growth culture on enzyme preparation in portions, or continuously during the growth and progress of the reaction. It may be added with or without dilution in a suitable solvent. Preferably, it is added as a 5–10 percent solution in an organic solvent such as ethanol.

The product of the microbiological conversion, i.e., the compounds of Formula II, can be isolated from the reaction mixture by conventional techniques utilizing differences between the product and impurities in such properties as solubility, adsorbability, distribution co-efficient between solvents, etc. The Formula II concentrate obtained upon separation may be further purified if desired. Conventional methods such as distillation and chromatography can be utilized in purification. Alternatively, the concentrate can be submitted directly to esterification with an appropriate cyclopropane carboxylic acid and the desired pyrethrin or pyrethrin analogs recovered directly. The suitability of the concentrate for direct esterification will, of course, be determined by the nature and extent of impurities present, which is dependent upon the specific organism selected for the conversion. The novel process is illustrated in greater detail by the following examples, which are to be construed as illustrative and not limitative of the invention.

Example 1

An agar test tube slant was prepared and seeded with spores of *Aspergillus niger* ATCC 9142 and set at 28° to incubate. The agar slant medium was composed of finely ground oatmeal, 5%; glucose, 2%; agar, 2% and the remainder distilled water. Before sterilization the medium had pH 7.0. In 5 days the slant was covered with spores. To the slant was added 10 ml. of spore diluent. The spore diluent contained 1 gram of agar and 0.1 gram of Aerosol OT (American Cyanamid) per liter of distilled water. The spores were washed off the agar surface and suspended in the aqueous diluent.

One-half ml. of this spore suspension was transferred aseptically to each of three 500 ml. Erlenmeyer flasks, each containing 100 ml. of sterile fermentation medium of the following composition, in gms. per liter of distilled water:

technical glucose, 20; $KH_2PO_4$, 1.5; $MgSO_4.7H_2O$, 1.5; $NH_4NO_3$, 1; enzyme hydrolyzed lactalbumin, 1; corn steep water solids, 1; soluble component of autolyzed yeast, 0.5; 1-glutamic acid, 0.5; $ZnSO_4.7H_2O$, 10 mg.

The pH was adjusted to 7.0 before sterilization and the flasks plugged with cotton plugs; the sterilization was accomplished by autoclaving at 120° C. for 30 minutes.

All the flasks were placed on a mechanical shaker which imparted to the flasks a circular rotary motion, 1¼ inch in radius, operating at 280–320 rotations per minute. A constant temperature of 28° C. was maintained.

After two days of incubation a heavy mycelial growth had developed in each flask and the pH had dropped to about 3.2–3.5.

To each flask was added aseptically 2 ml. of a sterile ethanol solution containing 50 mg. of cinerone. Incubation of the flasks was continued and at intervals of 2, 3 and 4 days after addition of the cinerone, successive replicate flasks were removed from the shaker and analyzed as follows: Ten grams of unfiltered broth was extracted at room temperature with 25 ml. of chloroform. The solvent phase was transferred to a dry vessel and the aqueous phase and emulsion were extracted once again with 15 ml. of chloroform. The solvent phase was removed and combined with the first solvent extract.

The chloroform extract was evaporated to dryness at room temperature by blowing over it a stream of oxygen-free nitrogen. The dry residue was then taken up in 1 ml. of methanol.

Three micro-liters of the methanol solution was injected into the sample port of a gas chromatograph equipped with a hydrogen flame ionization detector. The adsorption column used was six feet of ⅛ inch O.D. copper tubing packed with 5% Epon Resin 1001 on Chromasorb W, 60/80 mesh (available from Wilkins Instrument and Research Corp., Box 313, Walnut Creek, Calif.).

The passage of the sample through the column was recorded on a 0–1 millivolt recorder with a disc integrator. The instrument had been calibrated previously with samples of pure cinerone and cinerolone.

By analysis, the shaken flask samples of the *A. niger* ATCC 9142 fermentation were found to contain 301 mg. of cinerolone per liter

[B.P. 124–125°/0.02 mm.; $\eta_D^{27}$ 1.5091; $\lambda_{max.}^{CHCl_3}$ 2.76, 2.9 (broad), 5.85 and 6.06$\mu$; $\lambda_{max.}^{EtOH}$ 230 (12,300)]

Four day after addition of the cinerone to the fermenting mass there remained 84 mg. of residual cinerone per liter.

The progress of this fermentation is shown in the table which follows.

Conversion of Cinerone to Cinerolone by *Aspergillus niger* ATCC 9142

| Days After Dosing | 0 | 2 | 3 | 4 |
|---|---|---|---|---|
| | Mg. per liter | | | |
| Cinerolone | 0 | 132 | 167 | 301 |
| Cinerone | 500 | 327 | 220 | 84 |
| Percent conversion of cinerone to cinerolone (on basis of starting cinerone concentration) | | 26 | 33 | 60 |

Example 2

Spores of *Aspergillus niger* ATCC 9142 were grown on agar slants as described in Example No. 1, and the full 10 ml. of spore suspension recovered from one slant was transferred to a 14 liter stirred jar fermentor containing 8.5 liters of nutrient medium of the same composition as used in the shaken flasks described in Example 1, except that 5 ml. of trimethyl silane emulsion was added to control frothing. The fermentor was placed in a 28° C. water bath for temperature control.

The agitator of the fermentor was operated at 350 r.p.m. while maintaining a steady air flow of two liters per minute. After about twelve hours of incubation in this manner, the air flow was increased to three liters per minute and the agitation rate was increased to 500 r.p.m.

Incubation was continued in this manner for a total of 40 hours, by which time a dense finely-pelleted growth had developed and the pH had dropped to 2.0.

The pH was adjusted to 6.3 by the addition of sterile 5 normal sodium hydroxide, and to the jar was added aseptically 4 grams of cinerone dissolved in 15 ml. of ethanol. The incubation was continued with an increase of the air flow to 4 liters per minute and of the agitator speed to 550 r.p.m. The temperature was maintained at 28° C.

Samples for assay were taken at frequent intervals during incubation. They showed the course of the fermentation to be as follows:

| Hours after Dosing | Mg. per liter | | pH |
|---|---|---|---|
| | Cinerolone | Cinerone | |
| 0 | 0 | 490 | 6.3 |
| 23 | 116 | 253 | 3.8 |
| 29 | 127 | 210 | 3.7 |
| 35 | 135 | 111 | 3.6 |

The batch was harvested 35 hours following dosing. The mycelium was removed by filtration, washed with about 200 ml. of distilled water, and was discarded. The 200 ml. of wash was combined with the filtrate.

The filtrate was extracted successively three times, each time with 2,000 ml. of methylene chloride. The methylene chloride extracts were pooled and washed sucessively once with 1.5 l. of 1 normal hydrochloric acid and twice with 1.5 l. amounts of 5% aqueous sodium bicarbonate solution. The washed methylene chloride extract was then dried by the addition of a suitable amount of anhydrous sodium sulfate. After drying, the methylene chloride extract was evaporated in vacuo.

The concentrated extract (3.10 g.) was vacuum distilled to obtain recovered cinerone (58–110°/0.095 mm.; 0.812 g.) and an additional fraction (110–130°/0.09 mm.; 0.855 g.). The additional fraction was chromatographed on 15 g. of silica gel. Elution with 6% ethyl acetate in benzene gave an additional 0.121 g. of recovered cinerone followed by 0.108 g. of cinerolone. Identification was confirmed by comparison of the infrared, ultraviolet, nuclear magnetic resonance and mass spectra as well as the retention time on gas chromatography and $R_f$ on thin layer chromatography with those of cinerolone obtained from the natural source.

Example 3

Spore-producing agar slants of *Aspergillus niger* NRRL 3228 were grown as described for *A. niger* ATCC 9142 in Example 1. A tuft of spores from such a slant was transferred to a 500 ml. Erlenmeyer flask containing 100 ml. of medium whose composition was as follows, in grams per liter of distilled water:

Technical glucose, 40; corn starch, 20; tryptic digest of casein, 20; malt extract, 10; sodium nitrate, 3; monopotassium phosphate, 1; magnesium sulfate heptahydrate, 0.5; potassium chloride, 0.5; ferrous sulfate heptahydrate, 20 mg.

The inoculated flask was incubated at 28° C. on a rotary shaker as described in Example 1. After 48 hours of incubation, 50 ml. of the heavy growth which had developed was transferred to 8.5 liters of the medium described above contained in a 14 liter stirred jar fermentor. The fermentor was incubated at 32° C. while maintaining an air flow rate of 3 liters per minute and an agitator shaft speed of 700 revolutions per minute. A silicone-base defoamer was used as needed to control frothing.

When the growth in the jar was 55 hours old, the pH was adjusted to 5.7 with the appropriate amount of sterile sodium hydroxide and the pH was maintained at 5.7±.2 for the duration of the fermentation. After adjusting the pH, 3.5 gms. of cinerone dissolved in 35 ml. of ethanol was added, and the fermentation was continued for an additional 88 hours. The cells were filtered from the broth and the clear filtrate was processed as described in Example 2. The distillate was chromatographed on 10 g. of silica gel and eluted with 8% ethyl acetate in benzene to yield cinerolone.

Example 4

The fermentation was conducted with *Aspergillus niger* NRRL 3228 as described in Example 3, except that just before adding the cinerone, the pH of the fermentation was adjusted to 4.5, and was maintained within ±0.2 pH units of that level by automatic control for the duration of the fermentation. The 5.3 liters of broth remaining at the end of the fermentation period was processed as described in Example 2. The distillate was chromatographed on 10 g. of silica gel which upon elution with 6% ethyl acetate in benzene yielded cinerolone.

Example 5

This example illustrates the variety of fungi which are capable of converting cinerone to cinerolone.

Spore cultures of a variety of exemplary organisms were prepared as described in Example 1. Replicate 500 ml. Erlenmeyer flasks containing 100 ml. amounts of media appropriate for each organism were then inoculated with an abundant quantity of fresh spores. All flasks were incubated, dosed with cinerone, and assayed as described in Example 1. The performance of the various microorganisms is shown in the table which follows:

Conversion of Cinerone to Cinerolone (Shake Flask Experiments. Direct Assay by Vapor Phase Chromatography)

| Organism | Mg./l. of cinerolone from 500 mg./l. of cinerone | Percent conversion of cinerone to cinerolone |
| --- | --- | --- |
| *Aspergillus chevalieri* (Mangin) Thom and Church CBS [1] | 50 | 10 |
| *Aspergillus clavatus* Desm. CBS | 41 | 8 |
| *Aspergillus fasciculatus* QMB [2] 6950 | 52 | 10 |
| *Aspergillus flavus* ATCC [3] 15517 | 43 | 8 |
| *Aspergillus nidulans* (Eidam) Wint. CBS | 30 | 6 |
| *Aspergillus niger* ATCC 9142 | 301 | 60 |
| *Aspergillus niger* NRRL [4] 3228 | 105 | 21 |
| *Aspergillus oryzae* QM [2] 216M | 42 | 8 |
| *Aspergillus tamarii* QM 215M | 74 | 15 |
| *Bacillus alvei* QMB 1574 | 22 | 4 |
| *Bacillus pumilus* ATCC 6631 | ~20 | 4 |
| *Beauvaria bassiana* NRRL 3229 | 30 | 6 |
| *Cellvibrio vulgaris* QMB 31 | 37 | 7 |
| *Chaetomium globosum* NRRL 3230 | 120 | 24 |
| *Curvularia lunata* ATCC 13432 | 25 | 5 |
| *Curvularia pallescens* ATCC 12018 | 32 | 6 |
| *Cylindrocarpon radicicola* ATCC 11011 | ~25 | 5 |
| *Dacrymyces deliquescens* ATCC 13292 | 19 | 4 |
| *Dacryopinax spathularia* ATCC 13291 | 30 | 6 |
| *Fusarium culmorum* (W.G.Sm.) Sacc. CBS | 16 | 3 |
| *Helicostylum pyriforme* Bain. CBS | ~25 | ~5 |
| *Mucor hiemalis* Wehmer CBS | ~30 | 6 |
| *Mucor parasiticus* ATCC 6476 | 31 | 6 |
| *Penicillium cyclopium* ATCC 11,145 | ~25 | 5 |
| *Penicillium javanicum* QM 1876M | 30 | 6 |
| *Penicillium lilacinum* QM 1034M | 68 | 14 |
| *Rhizopus arrhizus* NRRL 2286 | 111 | 21 |
| *Rhizopus nigricans* NRRL 1477 | 62 | 12 |
| *Serratia marcescens* QMB 1466 | 49 | 10 |
| *Staphylococcus sp.* QMB 821 | 62 | 12 |
| *Streptomyces aureofaciens* ATCC 10,762 | 212 | 42 |
| *Streptomyces fradiae* (Waksman et Curtis) CBS | 19 | 4 |
| *Streptomyces griseus* NRRL 3231 | 33 | 6 |
| Thermophilic streptomycete NRRL 3233 | [5] 178 | [5] 9 |
| Thermophilic streptomycete NRRL 3232 | [5] 104 | [5] 5 |
| *Trichoderma lignorum* QM 216M | 95 | 19 |
| *Trichothecium roseum* ATCC 12,543 | 55 | 11 |

[1] Designates culture collection catalog description for Centraalbureau voor Schimmelcultures.
[2] Designates culture collection accession number for Quartermaster Research and Development Center.
[3] Designates culture collection accession number for American Type Culture Collection.
[4] Designates culture collection accession number for Northern Utilization Research and Development Division.
[5] Starting concentration of cinerone was 2 g./liter.

Example 6

An agar slant was inoculated with *Bacillus pumilus* ATCC 6631 and set aside to incubate at 28° C. The agar slant medium was composed of tryptic digest of casein, 1.70%; enzyme digest of soy flour, 0.3%; sodium chloride 0.5%; dipotassium phosphate 0.25%; dextrose, 0.25%; agar, 2% and the remainder distilled water. In 48 hours the heavy growth which had developed was suspended in 20 ml. of sterile water and 2 ml. of this suspension was placed into 100 ml. of sterile fermentation medium contained in a 500 ml. Erlenmeyer flask. The composition of the fermentation medium was the same as for the above culture medium except for omission of the agar. The inoculated flask was incubated at 28° C. with agitation on a rotary shaker. Within 48 hours the pH of the medium had dropped from 7.2 to 6.4. At this time 50 mg. of cinerone, dissolved in 2 ml. of ethanol, was added to the flask and the incubation with agitation was continued. Three days after addition of the cinerone to the flask, a sample of the fermenting solution was assayed as follows:

Five ml. of broth was withdrawn and extracted with 1.0 ml. of chromatographically pure methyl isobutyl ketone. 50 micro-liters of the clear solvent extract was spotted on a thin layer chromatography plate covered with fluorescent silica gel and allowed to dry. The plate was developed with ethyl acetate-benzene (60:40). The plate was then dried and the spots appearing were visualized under short wave ultraviolet light. The spot representing cinerolone was eluted from the plate with 5 ml. of ethanol. After removing all the adsorbent, the ethanol solution was suitably diluted with fresh ethanol and the optical density of the solution at 230mµ was determined and demonstrated the presence of cinerolone by comparison with the value for pure cinerolone.

Example 7

An agar slant was streaked with a culture of the thermophilic *Streptomycete sp.* NRRL 3232 and placed at a constant temperature of 48° C. to incubate. The composition of the nutrient medium in gms. per liter of distilled water is as follows:

Enzyme digest of soybean meal, 2; solids from aqueous extract of yeast, 2; tryptic digest of casein, 5; soluble starch, 10; mannitol, 5; magnesium sulfate, 7; H₂O 0.2; ferrous ammonium sulfate, 10 mg.; zinc chloride, 2.1 mg.; manganous chloride.4H₂O, 1.8 mg.; copper sulfate.5H₂O, 0.3 mg.; cobalt nitrate, 0.5 mg.; boric acid, 0.6 mg.; agar, 20 gms.

Within 24 hours an abundant growth had developed. The growth was suspended in 10 ml. of sterile water and 1 ml. of this suspension was transferred to a 500 ml. flask containing 100 ml. of nutrient medium. The composition is the same as for the agar slant except for omission of the agar. The inoculated flask was agitated on a rotary shaker at 48° C. After 24 hours a heavy growth had developed and the pH of the medium had risen from about 7.0 to pH 8.4.

200 mg. of cinerone, dissolved in 2 ml. of ethanol, was then added and the incubation was continued. A sample taken 5 days after addition of the cinerone was found by analysis as described in Example 1 to contain cinerolone.

Example 8

The procedure used was that described for Example 7 except that a different fermentation medium with following composition in grams per liter of distilled water was employed:

Enzyme digest of milk protein, 20; dried brewers yeast, 3; corn starch, 10; ferrous ammonium sulfate, 10 mg.; zinc chloride, 2.1 mg.; manganous chloride.4H₂O, 1.8 mg.; copper sulfate.5H₂O, 0.3 mg.; cobalt nitrate, 0.5 mg.; boric acid, 0.6 mg.

The fermenting medium was examined four days after addition of the cinerone and the flask was found by analysis to contain cinerolone.

Example 9

The growth from 2 heavily sporulated agar slants of *Aspergillus niger* ATCC 9142 was suspended in 20 ml. of sterile water. The composition of the agar slants in gms. per liter of distilled water was as follows:

Honey, 50; peptone, 10; agar, 20.

10 ml. amounts of the resulting spore suspension were transferred to each of two 14 liter stirred jar fermentors, each containing 8.5 liters of fermentation medium of the following composition, in grams per liter of distilled water:

Technical glucose, 20; magnesium sulfate.7H₂O, 1.5; monopotassium phosphate, 1.5; ammonium nitrate, 1.0; dried corn steep water solids, 1.0; enzyme hydrolyzed lactalbumin, 1.0; l-glutamic acid, 0.5; autolyzed yeast, 0.5; zinc sulfate.7H₂O, 10 mg.

The pH was adjusted to 6.8 with potassium hydroxide before sterilization and 5 ml. of 5% trimethyl silane emulsion was added as defoamer. The fermentors were sterilized by autoclaving at 120° C. for 30 minutes and then cooled quickly.

After inoculation the fermentors were incubated at 28° C., with agitator speed of 550 r.p.m. and air flow of 4 liters per minute. In 3 days the growth in each jar had become dense and the pH had dropped to 2.2–2.3. The pH was readjusted to 5.0 with sterile 5 N sodium hydroxide. Each jar was used to supply twenty 100 ml. aliquots of growth which were placed aseptically into sterile empty 500 ml. Erlenmeyer flasks.

To each of the forty flasks so filled were added 50 mg. of 3-methyl-2-propyl-cyclopent-2-enone dissolved in 1 ml. of dry ethanol. The flasks were then incubated with agitation at 28° C. After nine days the contents of the flasks were pooled and extracted with diethyl ether to give 4-hydroxy-3-methyl-2-propyl-cyclopent-2-enone.

$\lambda_{max}^{CHCl_3}$ 2.76, 2.92 (broad), 5.88µ and 6.05µ; $\lambda_{max}^{EtOH}$ 232 (10,900); molecular weight by mass spectrometry = 154.

Example 10

An aliquot of two-day-old heavy mycelial growth prepared as described in Example 1 was filtered through paper to separate the mycelium from the filtrate. An abrasive agent (alumina) was added to the mycelium and the mixture was ground until most of the mycelial strands had been ruptured. Thirty percent of the clarified filtrate was added to the ground paste and the two were mixed. This mixture was poured onto a Millipore filter having an average pore size of 0.2 micron. The liquid which passed through the Millipore filter, cell-free filtrate, was shown by a standard microbiological streak-plate procedure to be free of any viable *Aspergillus niger* as well as any other microorganism. Cinerone (50 mg./ml. of 95% ethanol) was added to the cell-free filtrate to a final concentration of 500 micrograms per ml. The flask containing this mixture was placed on the shaker. After one day a 2 ml. sample of the mixture was extracted with methylene chloride and analyzed by thin layer chromatography as described in Example 6, whereby the presence of cinerolone was demonstrated.

What is claimed is:

1. A process for the preparation of a

2-R-3-methyl-4-hydroxy-cyclopent-2-enone wherein the symbol R represents alkyl, alkenyl or alkadienyl of 3 to 5 carbon atoms which comprises enzymatically transforming a 2-R-3-methyl-cyclopent-2-enone wherein R has the same significance as above by the action of an enzyme system of a microorganism selected from the group consisting of microorganisms of the classes Phycomycetes, Ascomycetes, Deuteromycetes, Basidiomycetes, and Schizomycetes to form the corresponding 4 hydroxy compound.

2. A process according to claim 1 wherein the enzyme system employed is that of a microorganism selected from the group consisting of microorganisms of the orders Mucorales, Plectascineae, Sphaeriales, Moniliales, Dacrymycetales, Actinomycetales, Eubacteriales and Pseudomonodales.

3. A process according to claim 1 wherein the enzyme system employed is that of a microorganism selected from the group consisting of microorganisms of the families Mucoraceae, Thamnidaceae, Aspergillaceae, Chaetomiaceae, Moniliaceae, Dematiaceae, Tuberculariaceae, Dacrymycetaceae, Streptomycetaceae, Bacillaceae, Micrococcaceae, Enterobacteriaceae and Spirillaceae.

4. A process according to claim 1 wherein the enzyme system employed is that of a microorganism selected from the group consisting of microorganisms of the genera Mucor, Rhizopus, Helicostylum, Aspergillus, Penicillium, Chaetomium, Beauvaria, Trichothecium, Trichoderma, Curvularia, Cylindrocarpon, Fusarium, Dacrymyces, Dacryopinax, Streptomyces, Bacillus, Staphylococcus, Serratia and Cellvibrio.

5. A process according to claim 1 wherein the enzyme system employed is that of a microorganism selected from the group consisting of microorganisms of the species *Mucor hiemalis, Mucor parasiticus, Rhizopus arrhizus, Rhizopus nigricans, Helicostylum pyriforme, Aspergillus chevalieri, Aspergillus clavatus, Aspergillus fasciculatus, Aspergillus flavus, Aspergillus nidulans, Aspergillus niger, Aspergillus oryzae, Aspergillus tamarii, Penicillium cyclopium, Penicillium javanicum, Penicillium lilacinum, Chaetomium globosum, Beauvaria bassiana, Trichothecium roseum, Trichoderma lignorum, Curvularia lunata, Curvularia pallescens, Cylindrocarpon radicicola, Fusarium culmorum, Dacrymyces deliquescens, Dacryopinax spathularia, Streptomyces aureofaciens, Streptomyces fradiae, Streptomyces griseus, Bacillus alvei, Bacillus pumilus, Serratia marcescens* and *Cellvibrio vulgaris*.

6. A process according to claim 1 which comprises enzymatically transforming a 2-alkyl-3-methyl-cyclopent-2-enone by the action of an enzyme system of a microorganism selected from the group consisting of microorganisms of the genera Mucor, Rhizopus, Helicostylum, Aspergillus, Penicillium, Chaetomium, Beauvaria, Trichothecium, Trichoderma, Curvularia, Cylindrocarpon, Fusarium, Dacrymyces, Dacryopinax, Streptomyces, Bacillus, Staphylococcus, Serratia and Cellvibrio to form 2-alkyl-3-methyl-4-hydroxy-cyclopent-2-enone.

7. A method according to claim 1 wherein the enzyme system is a cell-free enzyme system.

8. A method according to claim 7 wherein the enzyme system employed is that of a microorganism selected from the group consisting of microorganisms of the genera Mucor, Rhizopus, Helicostylum, Aspergillus, Penicillium, Chaetomium, Beauvaria, Trichothecium, Trichoderma, Curvularia, Cylindrocarpon, Fusarium, Dacrymyces, Dacryopinax, Streptomyces, Bacillus, Staphylococcus, Serratia and Cellvibrio.

9. A process according to claim 1 comprising enzymatically transforming a 2-alkenyl-3-methyl-cyclopent-2-enone to a 2-alkenyl-3-methyl - 4 - hydroxy-cyclopent-2-enone.

10. A process according to claim 9 wherein the enzyme system employed is that of a microorganism selected from the group consisting of microorganisms of the orders Mucorales, Plectascineae, Sphaeriales, Moniliales, Dacrymycetales, Actinomycetales, Eubacteriales and Pseudomonodales.

11. A process according to claim 9 wherein the enzyme system employed is that of a microorganism selected from the group consisting of microorganisms of the families Mucoraceae, Thamnidaceae, Aspergillaceae, Chaetomiaceae Moniliaceae, Dematiaceae, Tuberculariaceae, Dacrymycetaceae, Streptomycetaceae, Bacillaceae, Micrococcaceae, Enterobacteriaceae and Spirillaceae.

12. A process according to claim 9 wherein the enzyme system employed is that of a microorganism selected from the group consisting of microorganisms of the genera Mucor, Rhizopus, Helicostylum, Aspergillus, Penicillium, Chaetomium, Beauvaria, Trichothecium, Trichoderma, Curvularia, Cylindrocarpon, Fusarium, Dacrymyces, Dacryopinax, Streptomyces, Bacillus, Staphylococcus, Serratia and Cellvibrio.

13. A process according to claim 9 wherein the enzyme system employed is that of a microorganism selected from the group consisting of microorganisms of the species *Mucor hiemalis, Mucor parasiticus, Rhizopus arrhizus, Rhizopus nigricans, Helicostylum pyriforme, Aspergillus chevalieri, Aspergillus clavatus, Aspergillus fasciculatus, Aspergillus flavus, Aspergillus nidulans, Aspergillus niger, Aspergillus oryzae, Aspergillus tamarii, Penicillium cyclopium, Penicillium javanicum, Penicillium lilacinum Chaetomium globosum, Beauvaria bassiana, Trichothecium roseum, Trichoderma lignorum, Curvularia lunata, Curvularia pallescens, Cylindrocarpon radicicola, Fusarium culmorum, Dacrymyces deliquescens, Dacryopinax spathularia, Streptomyces aureofaciens, Streptomyces fradiae, Streptomyces griseus, Bacillus alvei, Bacillus pumilus, Serratia marcescens* and *Cellvibrio vulgaris*.

14. A process according to claim 9 which comprises enzymatically transforming cinerone to cinerolone.

15. A process according to claim 14 wherein the enzyme system employed is that of a microorganism selected from the group consisting of microorganisms of the orders Mucorales, Plectascineae, Sphaeriales, Moniliales, Dacrymycetales, Actinomycetales, Eubacteriales and Pseudomonodales.

16. A process according to claim 14 wherein the enzyme system employed is that of a microorganism selected from the group consisting of microorganisms of the genera Mucor, Rhizopus, Helicostylum, Aspergillus, Penicillium, Chaetomium, Beauvaria, Trichothecium, Trichoderma, Curvularia, Cylindrocarpon, Fusarium, Dacrymyces, Dacryopinax, Streptomyces, Bacillus, Staphylococcus, Serratia and Cellvibrio.

17. A process according to claim 14 wherein the enzyme system employed is that of a microorganism selected from the group consisting of microorganisms of the species *Mucor hiemalis, Mucor parasiticus, Rhizopus arrhizus, Rhizopus nigricans, Helicostylum pyriforme, Aspergillus chevalieri, Aspergillus clavatus, Aspergillus fasciculatus, Aspergillus flavus, Aspergillus nidulans, Aspergillus niger, Aspergillus oryzae, Aspergillus tamarii, Penicillium cyclopium, Penicillium javanicum, Penicillium lilacinum, Chaetomium globosum, Beauvaria bassiana, Trichothecium roseum, Trichoderma lignorum, Curvularia lunata, Curvularia pallescens, Cylindrocarpon radicicola, Fusarium culmorum, Dacrymyces deliquescens, Dacryopinax spathularia, Streptomyces aureofaciens, Streptomyces fradiae, Streptomyces griseus, Bacillus alvei, Bacillus pumilus, Serratia marcescens* and *Cellvibrio vulgaris*.

18. A process according to claim 6 which comprises enzymatically transforming 2-n-propyl-3-methyl-cyclopent-2-enone by the action of an enzyme system of a microorganism selected from the group consisting of microorganisms of the species *Mucor hiemalis, Mucor parasiticus, Rhizopus arrhizus, Rhizopus nigricans, Helicostylum pyriforme, Aspergillus chevalieri, Aspergillus clavatus, Aspergillus fasciculatus, Aspergillus flavus, Aspergillus nidulans, Aspergillus niger, Aspergillus oryzae, Aspergillus tamarii, Penicillium cyclopium, Penicillium javanicum, Penicillium lilacinum, Chaetomium globosum, Beauvaria bassiana, Trichothecium roseum, Trichoderma lignorum, Curvularia lunata, Curvularia pallescens, Cylindrocarpon radicicola, Fusarium culmorum, Dacrymyces deliquescens, Dacryopinax spathularia, Streptomyces aureofaciens, Streptomyces fradiae, Streptomyces griseus, Bacillus alvei, Bacillus pumilus, Serratia marcescens* and *Cellvibrio vulgaris* to form 2-propyl-3-methyl-4-hydroxy-cyclopent-2-enone.

References Cited

UNITED STATES PATENTS 3,281,330   10/1966   Fonken et al. _____ 195—51

ALVIN E. TANENHOLTZ, *Primary Examiner*.